(12) United States Patent
Tsai et al.

(10) Patent No.: US 11,774,567 B2
(45) Date of Patent: Oct. 3, 2023

(54) GRAPHICAL ULTRASONIC MODULE AND DRIVER ASSISTANCE SYSTEM

(71) Applicant: LUXSHARE-ICT CO., LTD., Taipei (TW)

(72) Inventors: Wang-Ting Tsai, Taipei (TW); Ta-Yu Lin, Taipei (TW); Chen-Yu Chung, Taipei (TW); Shr-Min Chen, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 79 days.

(21) Appl. No.: 17/675,609

(22) Filed: Feb. 18, 2022

(65) Prior Publication Data

US 2022/0171039 A1    Jun. 2, 2022

(30) Foreign Application Priority Data

Sep. 30, 2021    (TW) .................................. 110136611

(51) Int. Cl.
*G01S 7/521*    (2006.01)
*G01S 7/539*    (2006.01)
*G01S 15/93*    (2020.01)
*G01S 15/931*    (2020.01)

(52) U.S. Cl.
CPC .............. *G01S 7/521* (2013.01); *G01S 7/539* (2013.01); *G01S 15/931* (2013.01); *G01S 2015/937* (2013.01)

(58) Field of Classification Search
CPC . G01S 7/521; G01S 15/87; G01S 7/53; G01S 7/52004; G01S 15/931; G01S 2015/938; G01S 7/539; G01S 2015/937; B60W 50/0098; B60W 2720/10; B60W 2554/804; B60W 2420/54; B60W 2050/0075; B60W 2754/30; B60W 2554/402

See application file for complete search history.

(56) References Cited

U.S. PATENT DOCUMENTS

| | | | |
|---|---|---|---|
| 8,255,144 B2 * | 8/2012 | Breed | G01S 17/86 340/436 |
| 9,224,297 B2 * | 12/2015 | Shaffer | G08G 1/14 |
| 10,021,497 B2 | 7/2018 | Gong | |
| 10,315,563 B1 | 6/2019 | Harper et al. | |

(Continued)

FOREIGN PATENT DOCUMENTS

| CN | 107856606 A | 3/2018 |
|---|---|---|
| CN | 109642937 A | 4/2019 |

(Continued)

*Primary Examiner* — Daniel L Murphy
*Assistant Examiner* — Amie M Ndure
(74) *Attorney, Agent, or Firm* — Birch, Stewart, Kolasch & Birch, LLP (57) ABSTRACT

A graphical ultrasonic module and driver assistance system are provided. The graphical ultrasonic module includes an ultrasonic sensor array and an ultrasonic transmitter array. The ultrasonic sensor array includes three or more ultrasonic sensors, and the ultrasonic sensors form a virtual plane. The ultrasonic transmitter array includes a plurality of ultrasonic transmitters. The geometric center of the ultrasonic transmitter array is substantially the same as the geometric center of the ultrasonic sensor array.

9 Claims, 6 Drawing Sheets

(56) References Cited

U.S. PATENT DOCUMENTS

| | | | | |
|---|---|---|---|---|
| 2007/0279199 | A1* | 12/2007 | Danz | G08G 1/166 |
| | | | | 701/301 |
| 2010/0302069 | A1* | 12/2010 | Frank | G01S 7/527 |
| | | | | 340/932.2 |
| 2011/0063131 | A1* | 3/2011 | Toledo | B62D 15/0285 |
| | | | | 340/932.2 |
| 2011/0254674 | A1* | 10/2011 | Wang | G01S 15/931 |
| | | | | 340/435 |
| 2011/0260887 | A1* | 10/2011 | Toledo | B62D 15/0285 |
| | | | | 340/932.2 |
| 2012/0197492 | A1* | 8/2012 | Schneider | B62D 15/0285 |
| | | | | 701/41 |
| 2015/0374335 | A1 | 12/2015 | Brown et al. | |
| 2022/0043145 | A1* | 2/2022 | Zhu | G01S 7/521 |

FOREIGN PATENT DOCUMENTS

| | | |
|---|---|---|
| CN | 110546038 B | 11/2020 |
| TW | 201022700 A | 6/2010 |
| TW | 201510555 A | 3/2015 |
| TW | 201706010 A | 2/2017 |
| WO | WO 2018/032494 A1 | 2/2018 |

* cited by examiner

GRAPHICAL ULTRASONIC MODULE AND DRIVER ASSISTANCE SYSTEM

CROSS-REFERENCE TO RELATED APPLICATION

This non-provisional application claims priority under 35 U.S.C. § 119(a) to Patent Application No. 110136611 filed in Taiwan, R.O.C. on Sep. 30, 2021, the entire contents of which are hereby incorporated by reference.

BACKGROUND

Technical Field

The instant disclosure is related to a graphic ultrasonic module and a driver assistance system applying thereof.

Related Art

The ultrasonic transmitter of an in-vehicle ultrasonic module known to the inventor is positioned at a specific angle to increase the effective transmission distance of ultrasonic waves, and then the ultrasonic sensor of the in-vehicle ultrasonic module receives the ultrasonic waves reflected by the obstacles in the environment.

However, due to the dispersion characteristics of the sound waves, this kind of in-vehicle ultrasonic module would be only suitable for checking obstacles around the vehicle before the vehicle is actuated or during the vehicle is reversing.

SUMMARY

Therefore, a graphical ultrasonic module and a driver assistance system are provided. In one embodiment, the graphical ultrasonic module includes an ultrasonic sensor array and an ultrasonic transmitter array. The ultrasonic sensor array includes at least three ultrasonic sensors, and the three ultrasonic sensors together form a virtual plane. The ultrasonic transmitter array includes a plurality of ultrasonic transmitters. The geometric center of the ultrasonic transmitter array is substantially the same as the geometric center of the ultrasonic sensor array.

The driver assistance system mentioned above is for detecting a target object. The driver assistance system includes the graphical ultrasonic module, a memory, and a processor. The memory stores a look-up table, and the look-up table includes a correspondence relationship between types of the target object and energy grades of an ultrasonic wave. The processor is coupled to the ultrasonic sensors and the ultrasonic transmitters. The processor is configured to control the ultrasonic transmitters to generate an ultrasonic signal, to determine a distance between the target object and the graphical ultrasonic module based on a trigger time that the ultrasonic signal is generated and a reception time that the ultrasonic signal is received by the ultrasonic sensors, to add up an energy of the ultrasonic signal received by each of the sensors to obtain an energy grade of the ultrasonic wave, and to read the look-up table and determine a type of the target object based on the distance between the target object and the graphical ultrasonic module and the energy grade of the ultrasonic wave.

BRIEF DESCRIPTION OF THE DRAWINGS

The disclosure will become more fully understood from the detailed description given herein below for illustration only, and thus not limitative of the disclosure, wherein.

DETAILED DESCRIPTION

In some embodiments of the instant disclosure, a graphical ultrasonic module 10 includes an ultrasonic sensor array and an ultrasonic transmitter array. The ultrasonic sensor array includes a plurality of ultrasonic sensors 102, and the ultrasonic transmitter array includes a plurality of ultrasonic transmitters 101. The graphical ultrasonic module can be used for driving monitoring of transportations. The transportations may refer to large and small passenger cars, trucks, construction vehicles, but are not limited thereto; it can also refer to boats or power equipment. The graphic ultrasonic module 10 may be disposed behind the vehicle or at two sides of the vehicle to facilitate the detection of an area not covered by the driver's field of vision. However, the graphical ultrasonic module 10 may also be disposed in front of the vehicle to facilitate the provision of information about the vehicle's driving environment for the in-vehicle computer in automatic driving mode. The ultrasonic transmitter 101 or the ultrasonic sensor 102 may be transducers made of piezoelectric materials, such as, but not limited to, lead zirconate titanate (PZT), lead lanthanum zirconate titanate (PLZT), lead magnesium niobate (PMN-PT), lead metaniobate, bismuth sodium titanate (BNT), lithium niobate, lead titanate, barium titanate, or any other piezoelectric materials, such as piezoelectric ceramics, crystals, plastics, or their composite materials.

Figure 1:
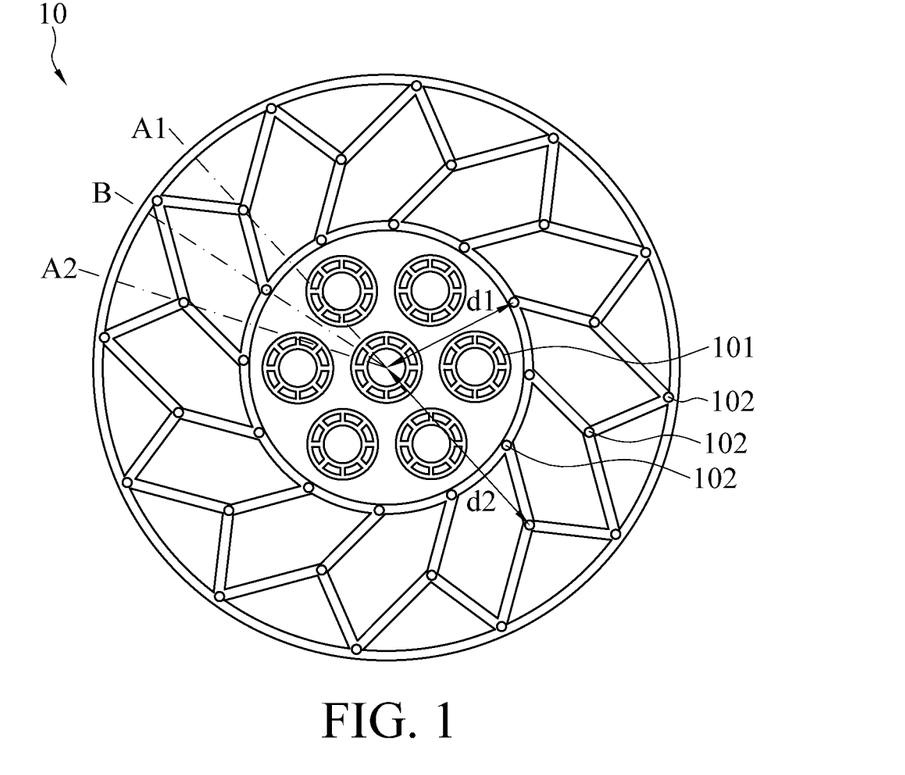
FIG. 1 illustrates a schematic view of a configuration of a graphical ultrasonic module according to a first embodiment of the instant disclosure.

FIG. 1 illustrates a schematic view of a configuration of a graphical ultrasonic module according to a first embodiment of the instant disclosure. Please refer to FIG. 1. The graphical ultrasonic module 10 includes an ultrasonic sensor array including a plurality of ultrasonic sensors 102 and an ultrasonic transmitter array including a plurality of ultrasonic transmitters 101. The term "array" refers to a geometric pattern with a regular arrangement, such as, but not limited to, a square matrix. For example, as shown in FIG. 1, a single ultrasonic transmitter 101 may be surrounded by six ultrasonic transmitters 101. Alternatively, in some embodiments, two side-by-side ultrasonic transmitters 101, or a square array formed by four ultrasonic transmitters 101 may be used as well. The geometric center of the ultrasonic sensor array is substantially the same as the geometric center of the ultrasonic transmitter array. In some embodiments, the ultrasonic transmitter array surrounds the ultrasonic sensor array. In some other embodiments, the ultrasonic sensor array surrounds the ultrasonic transmitter array, so that the ultrasonic signals emitted from the ultrasonic transmitter 101 can be received by the surrounding ultrasonic sensor arrays. By adjusting the delay time t of each of the ultrasonic transmitters 101 to transmit the ultrasonic waves, the ultrasonic signals can be constructively interfered or destructively interfered by each other in different transmission directions so as to achieve the effect of beamforming. Therefore, the ultrasonic transmitter array can generate ultrasonic signals with concentrated energy toward the target direction so as to avoid the dispersion and consumption of the sound waves. Similarly, by adjusting the delay time t of each of the ultrasonic sensors 102 to receive the ultrasonic waves, the intensity of the ultrasonic signal detected by the ultrasonic sensor array in a particular direction can be enhanced.

Figure 2A:
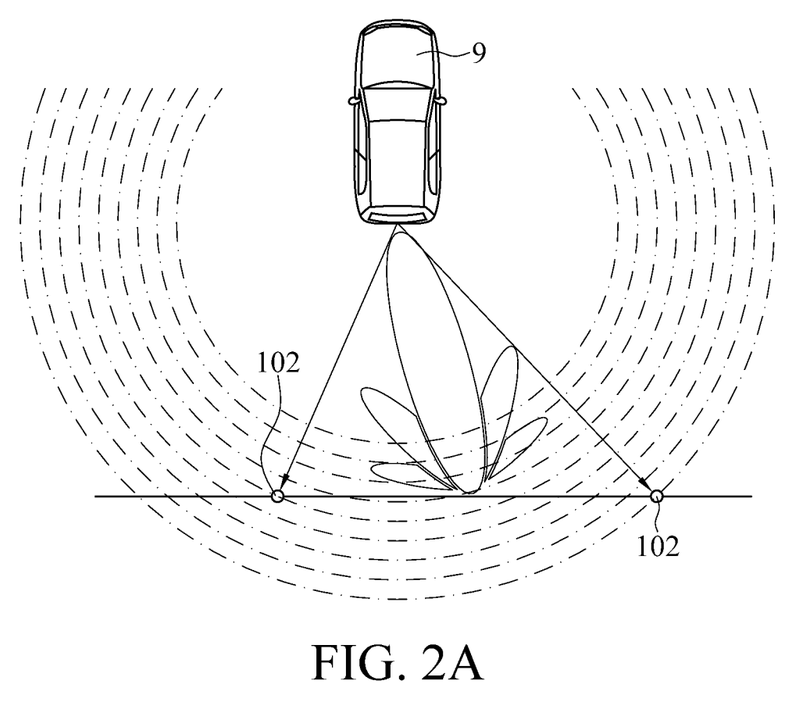
FIG. 2A illustrates a schematic view of beamforming.
Figure 2B:
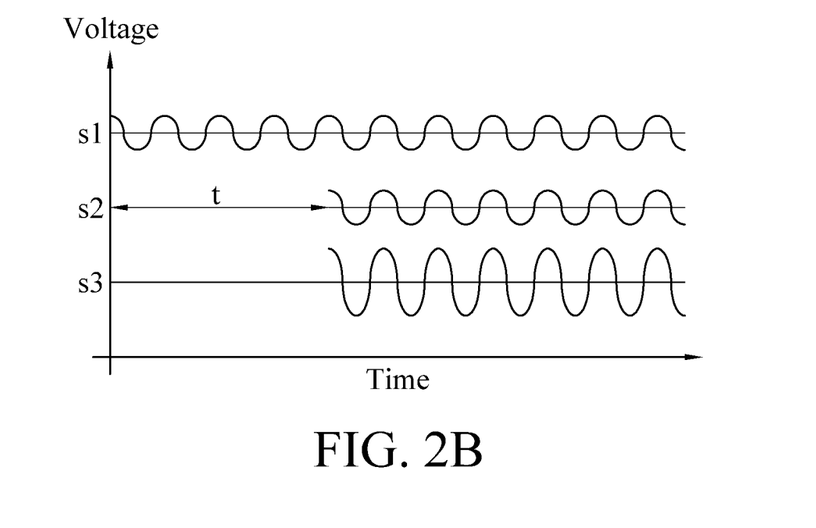
FIG. 2B illustrates a schematic view of the signals generated by the ultrasonic sensors.

FIG. 2A illustrates a schematic view of beamforming. FIG. 2B illustrates a schematic view of the signals generated by the ultrasonic sensors 102. Please refer to FIG. 2A. The ultrasonic sensors 102 receive the ultrasonic waves reflected by the target object 9. Since the ultrasonic sensor 102 at the left side (the left ultrasonic sensor 102) of FIG. 2A is closer to the target object 9 as compared to the ultrasonic sensor 102 at the right side (the right ultrasonic sensor 102) of FIG. 2A, the sound waves reach the left ultrasonic sensor 102 first and then reach the right ultrasonic sensor 102. Please refer to FIG. 2B. The horizontal axis of FIG. 2B represents time, whereas the vertical axis represents voltage of the detected signal. The signal s1 is the electrical signal generated by the left ultrasonic sensor, the signal s2 is the electrical signal generated by the right ultrasonic sensor 102, and the signal s3 is a superimposed signal of the signal s1 and the signal s2 after the delay time t is adjusted. Since the sound waves reach different ultrasonic sensors 102 at different times, the signal s2 generated by the right ultrasonic sensor 102 delays from the signal s1 generated by the left ultrasonic sensor 102 by a delay time t, as shown in FIG. 2B. In order to enhance the signal intensity of the ultrasonic sensor array in the direction toward the target object 9, the signal s1 generated by the left ultrasonic sensor 102 is adjusted by a delay time t, so that the signal s1 is in phase with the signal s2 generated by the right ultrasonic sensor 102. Then, the signal s1 and the signal s2 are superimposed to generate the signal s3.

In some embodiments, the ultrasonic sensor array of the graphical ultrasonic module 10 includes three ultrasonic sensors 102, and the three ultrasonic sensors 102 together form a virtual plane. By adjusting the delay time t of each of the three ultrasonic sensors 102, the beamforming direction of the ultrasonic sensor array can be adjusted in each of the three dimensions. Hence, to meet requirements in different scenarios, the beamforming direction of the graphical ultrasonic module 10 can be adjusted. For example, when the graphical ultrasonic module 10 is placed at the rear of a large passenger car, the direction of the beamforming can be adjusted toward the ground to facilitate the detection of small passenger cars with lower height. In some embodiments, the ultrasonic sensor array of the graphical ultrasonic module 10 includes more than three ultrasonic sensors 102 in the same virtual plane, or the ultrasonic sensor array may include several groups of the ultrasonic sensors 102 in different virtual planes so as to facilitate the sensing of ultrasonic signals in multiple beamforming directions.

Please refer back to FIG. 1. In some embodiments, the ultrasonic sensor array surrounds the ultrasonic transmitter array, and the plurality of ultrasonic sensors 102 of the ultrasonic sensor array is disposed on the circumference of a circle that the center of the circle is substantially the same as the geometric center of the ultrasonic transmitter array.

Thus, each of the ultrasonic sensors 102 on the circle has the same distance to the geometric center of the ultrasonic transmitter array. In this embodiment, through this configuration, the delay time t can be set without additionally considering the reception time difference of the sound waves between different ultrasonic sensors 102 caused by the difference in the position of each of the ultrasonic sensors 102. However, the configuration of the ultrasonic sensor array is not limited thereto. Please refer to FIG. 3.

Figure 3:
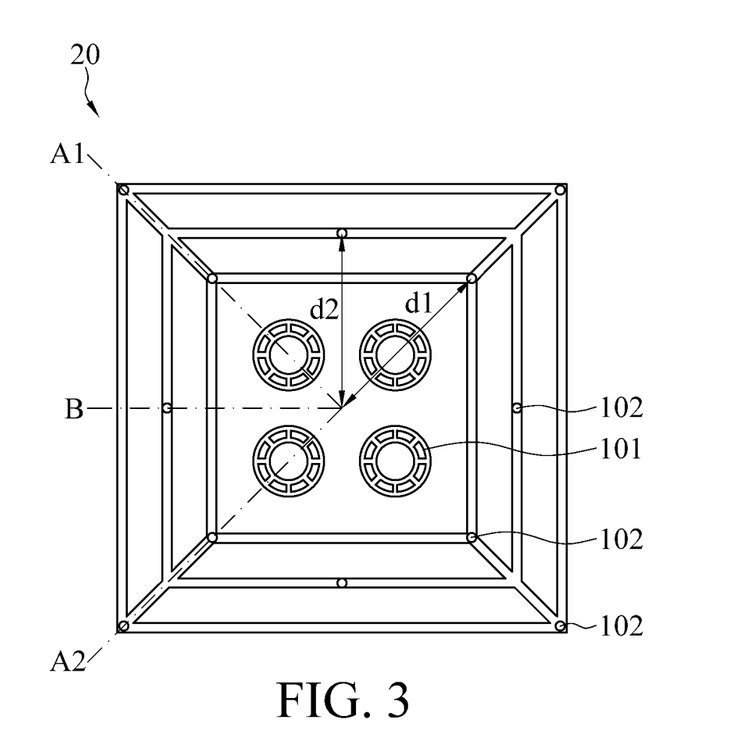
FIG. 3 illustrates a schematic view of a configuration of a graphical ultrasonic module of the first embodiment.

In some embodiments, the ultrasonic sensor array of the graphical ultrasonic module 20 surrounds the ultrasonic transmitter array, and the plurality of ultrasonic sensors 102 of the ultrasonic sensor array is disposed at the corner or on the edge of multiple squares that the geometric center of the squares are substantially the same as the geometric center of the ultrasonic transmitter array. Since the distances between the geometric center of a square and any two points on a side of the square may not be equal, the delay time t has to be adjusted accordingly. For example, if the shortest distance between the geometric center of the square and one side of the square is "a", the distance between the geometric center of the square and a corner of the square is "a√2", and the distance between the plane in which the ultrasonic sensor array is located and the plane in which the target object 9 is located is "b". Thus, there is a path difference δ between a path from the ultrasonic transmitter 101 (the generation place of the ultrasonic waves) to the ultrasonic sensor 102 located on the side and a path from the ultrasonic transmitter 101 to the ultrasonic sensor 102 located at the corner. The path difference δ can be obtained according to the following Equation 1:

$$2\left( \sqrt{\left(\frac{a\sqrt{2}}{2}\right)^2 + b^2} - \sqrt{\left(\frac{a}{2}\right)^2 + b^2} \right) \quad \text{(Equation 1)}$$

Therefore, the delay time t can be obtained based on the path difference δ divided by the speed of sound and based on the effective distance of the ultrasonic waves (assumed to be distance "b"). According to some embodiments, each two adjacent ultrasonic sensors of the plurality of ultrasonic sensors 102 of the ultrasonic sensor array are substantially equally spaced from each other along the circumference of the circle, so that the ultrasonic sensors 102 are spaced substantially equally around the ultrasonic transmitter array. For example, as shown in FIG. 1, the ultrasonic sensors 102 on each circle are formed as one group, each group contains twelve ultrasonic sensors 102 and the ultrasonic sensors 102 are evenly placed on the circumference of the circle, so that the spacing between any two adjacent ultrasonic sensors 102 are substantially the same. Please refer to FIG. 3. In some embodiments, the ultrasonic sensors 102 on each square frame is formed as one group, each group contains four ultrasonic sensors 102 and the ultrasonic sensors 102 are evenly placed on the square frame, so that the spacing between any two adjacent ultrasonic sensors 102 are substantially the same. Therefore, in this embodiment, by the configuration of the plurality of ultrasonic sensors 102 being equally spaced substantially, it facilitates the obtainment of the delay time t of the ultrasonic sensors 102 in each of the directions of the graphical ultrasonic module 10 while performing the beamforming.

In some embodiments, the ultrasonic sensor array contains a plurality of groups of ultrasonic sensors 102. The distances between each of the ultrasonic sensors 102 in the same group and the geometric center of the ultrasonic transmitter array are the same, while the distances between the ultrasonic sensors 102 in the different groups and the geometric center of the ultrasonic transmitter array are different. For example, as shown in FIG. 1, the ultrasonic sensor array may include three groups of the ultrasonic sensors 102 on the circumferences of the inner ring, the second outer ring, and the outermost ring, respectively. In this embodiment, the twelve ultrasonic sensors 102 on each circle are at the same distance from the geometric center of the ultrasonic transmitter array. The distance between each of the twelve ultrasonic sensors 102 on the inner ring and the geometric center of the ultrasonic transmitter array is the distance d1, and the distance between each of the twelve ultrasonic sensors 102 on the second outer ring and the geometric center of the ultrasonic transmitter array is the distance d2, and the distance d2 is greater than the distance d1. As the number of the circles in the ultrasonic sensor array increases, the energy of the ultrasonic wave becomes more concentrated at the main lobe, and the energy of the side lobes become more suppressed, thereby improving the directivity, detection distance, and signal resolution. Moreover, in one or some embodiments, with the modularized sensor array design, the production line planning can be adjusted correspondingly according to the product resolution requirements of the graphical ultrasonic module 10. More specifically, in one or some embodiments, in a first production line with lower resolution requirements, the products can be assembled with fewer circles of the ultrasonic sensor array; while in a second production line with higher resolution requirements, products in the first production line can be further processed to increase additional circle(s) of the ultrasonic sensor array without rearranging the production line for different resolution products.

In some embodiments, an imaginary connection line between any one of the ultrasonic sensors 102 on the inner circle and the geometric center of the ultrasonic transmitter array is between two imaginary connection lines respectively between any two of the ultrasonic sensors 102 on the outer ring and the geometric center of the ultrasonic transmitter array. For example, as shown in FIG. 1 and FIG. 3, the imaginary connection line B between the ultrasonic sensor 102 on the inner circle and the geometric center of the ultrasonic transmitter array is between the two imaginary connection lines A1 and A2 respectively formed by the two ultrasonic sensors 102 on the outer ring with the geometric center of the ultrasonic transmitter array. It is understood that, the description "the imaginary connection line B is between the two imaginary connection lines A1 and A2" may indicate that the angle between the imaginary connection lines A1 and B is less than the angle between the imaginary connection lines A1 and A2. It is understood that, the angle may be less than or equal to 180 degrees. Therefore, the ultrasonic sensor 102 on the inner ring and the two ultrasonic sensors 102 on the outer ring together form an array unit on the same virtual plane. In some embodiments, the ultrasonic array includes a plurality of groups of array units so as to increase the degree of energy concentration of the main lobe of the beamforming, thereby improving the signal resolution.

Figure 4:
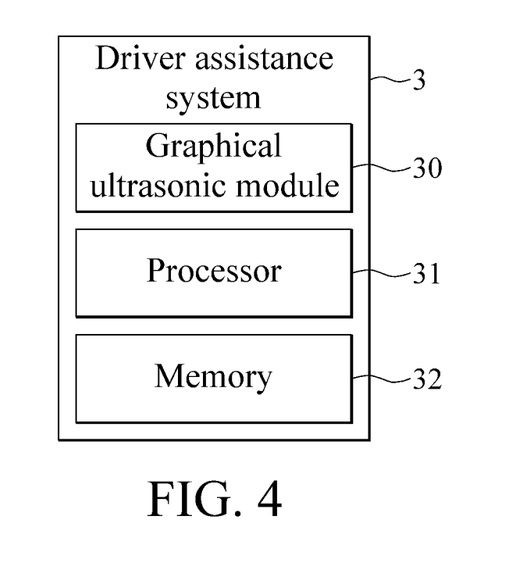
FIG. 4 illustrates a schematic block diagram of a driver assistance system according to an exemplary embodiment of the instant disclosure.

In some embodiments, the graphical ultrasonic module 30 can be applied in a driver assistance system 3. FIG. 4 illustrates a block diagram of the driver assistance system according to an exemplary embodiment of the instant disclosure. Please refer to FIG. 4. The driver assistance system 3 includes a graphical ultrasonic module 30, a processor 31, and a memory 32. The graphical ultrasonic module 30 and the memory 32 are signally coupled to the processor 31, for example, by wired or wireless signal transmission. The wireless signal transmission may be conducted through, but is not limited to, Global System for Mobile communication (GSM), Personal Handy-phone System (PHS), Code Division Multiple Access (CDMA) system, Wideband Code Division Multiple Access (WCDMA) system, Long Term Evolution (LTE) system, Worldwide interoperability for Microwave Access (WiMAX) system, Wireless Fidelity (Wi-Fi), ZigBee, Bluetooth, and other communication protocols. The memory 32 may be a flash memory or a read-only memory, and may be but not limited to an Erasable Programmable Read-Only Memory (EPROM), a Flash Read-Only Memory (Flash ROM), an Electrically-Erasable Programmable Read-Only Memory (EEPROM), or a FRU (Field-Replaceable Unit) EEPROM. The processor 31 may be set in a car chip, a mobile electronic device, or a remote operation control device, and may be but not limited to, a Micro-Control Unit (MCU), an Application Specific Integrated Circuit (ASIC), a Field Programmable Gate Array (FPGA), or a logic circuit.

Figure 5:
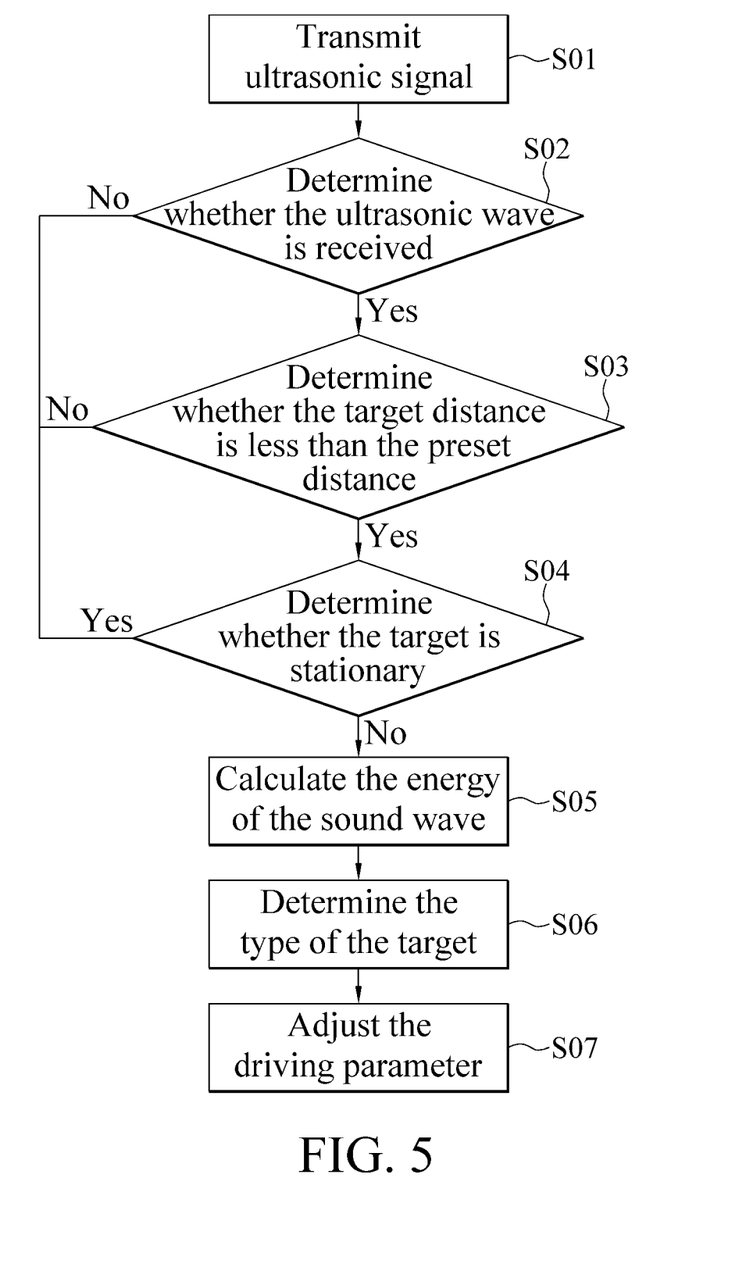
FIG. 5 illustrates a flowchart of the operation of the driver assistance system according to the exemplary embodiment of the instant disclosure.
Figure 6A:
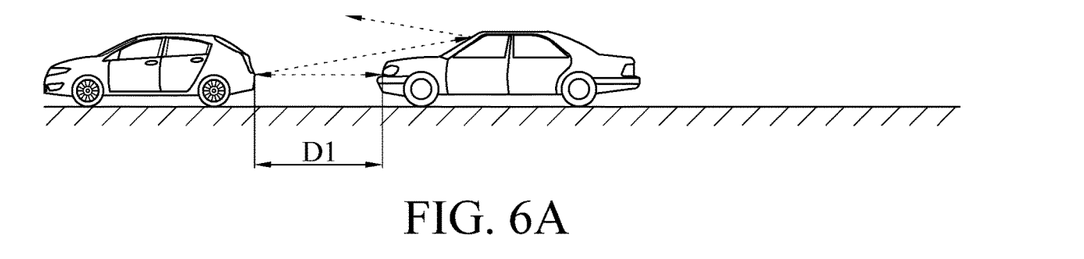
FIG. 6A to FIG. 6D illustrate schematic application diagrams of the driver assistance system according to different embodiments of the instant disclosure.
Figure 6B:
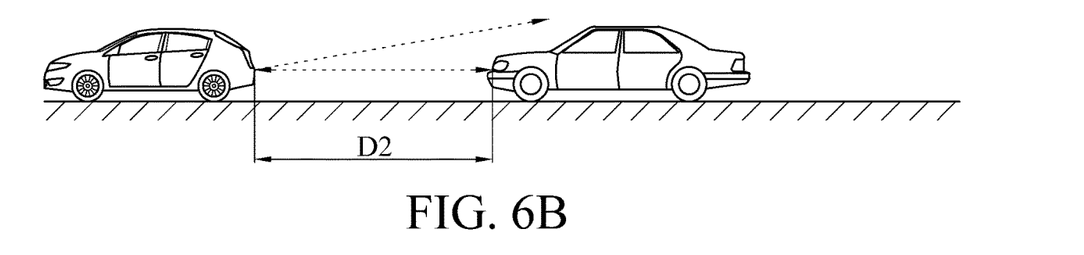
Figure 6C:
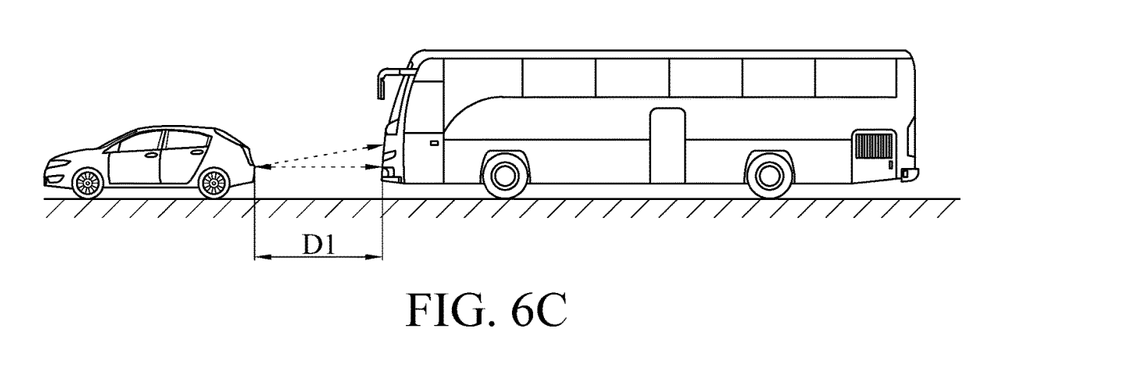
Figure 6D:
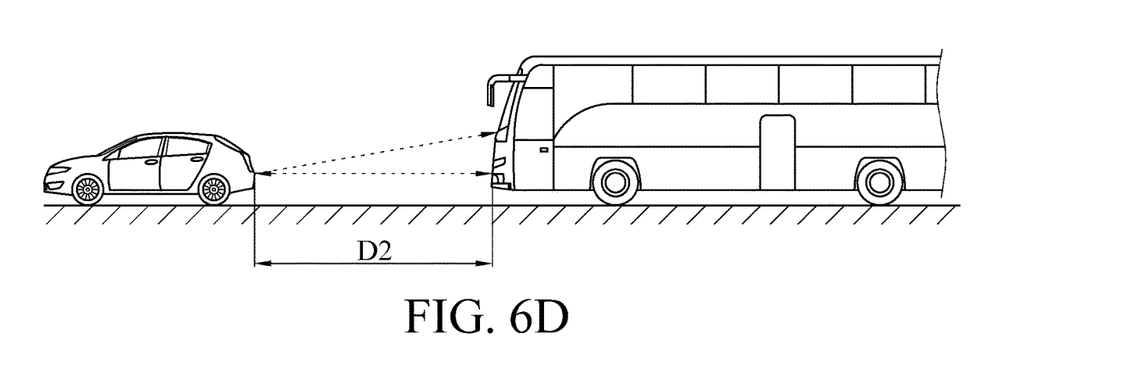

FIG. 5 illustrates a flowchart of the operation of the driver assistance system according to the embodiment of the instant disclosure. Please refer to FIG. 5. The processor 31 controls the ultrasonic transmitter to generate ultrasonic signals (step S01). The frequency range of the ultrasonic signal may be between 20 kilohertz and 100 kilohertz (kHz). The processor 31 generates a trigger signal to drive the ultrasonic transmitter 101, and the processor 31 stores the trigger time temporarily. In some embodiments, the processor 31 controls the phase delay between the ultrasonic signals generated by the plurality of ultrasonic transmitters 101, thereby adjusting the ultrasonic wave direction. After the ultrasonic waves are reflected by obstacles in the surrounding environment, the ultrasonic waves are received by the ultrasonic sensor 102. Subsequently, the processor 31 determines the reception time of the ultrasonic waves. For example, the ultrasonic sensor 102 receives the ultrasonic signal and converts the ultrasonic signal into an electrical signal. The processor 31 determines that ultrasonic signal is received when the voltage or energy of the electrical signal reaches a threshold value. The processor 31 can make the determination based on the electrical signal generated by a single ultrasonic sensor 102 or the summation of the electrical signals generated by several ultrasonic sensors 102. In some embodiments, when the processor 31 determines that no ultrasonic wave is received (step S02, when the result of the determination is "No"), then the ultrasonic wave is continuously emitted (step S01). On the other hand, when the processor 31 determines an ultrasonic wave is received, the distance and the moving speed of the target object 9 relative to the graphical ultrasonic module 30 are estimated based on (1) the time difference between the trigger time and the reception time of the ultrasonic wave, (2) the frequency of the transmitted ultrasonic wave and the frequency of the received ultrasonic wave, (3) the current speed of sound, and (4) the current moving speed of a vehicle having the driver assistance system. More specifically, in this embodiment, the moving speed $v_o$ of the target object 9 can be obtained according to the following Equation 2 and Equation 3:

$$f'(v \mp v_s) = f(v \pm v_o) \quad \text{(Equation 2)}$$

$$f''(v \mp v_o) = f'(v \pm v_s) \quad \text{(Equation 3)}$$

In Equation 3, f represents the frequency of the ultrasonic wave generated by the ultrasonic transmitter 101; f' represents the frequency of the ultrasonic wave reflected by the target object 9; f" represents the frequency of the ultrasonic wave received by the ultrasonic sensor 102; v represents the current speed of sound; and $v_s$ represents the current moving speed of a vehicle having the driver assistance system. Take a vehicle with the graphical ultrasonic module 30 installed at the rear of the vehicle as an example, when the vehicle is moving forward, the processor 31 may obtain the current speed of the vehicle from the speed sensor of the vehicle. Since the vehicle moves forward, the moving speed is $-v_s$. By further calculating the product of the relative speed of the vehicle with respect to the target object 9 and the time difference between the transmission time and the reception time of the ultrasonic wave, the distance between the target object 9 and the vehicle can be obtained. According to some embodiments, the memory 32 stores a preset target distance, and the processor 31 reads the preset target distance and compares the preset target distance with the current distance between the target object 9 and the graphical ultrasonic module 30 to determine whether the distance between the target object 9 and the graphical ultrasonic module 30 is less than the preset target distance (step S03). The preset target distance can be set as the effective sensing distance of the ultrasonic sensor 102, or can be set according to a distance where the attenuated ultrasonic energy still within the allowable range, or can be set according to the driving safety distance. For example, the preset target distance can be set to 100 meters for confirming whether other obstacle enters the preset target distance or not.

In some embodiments, the processor 31 controls the ultrasonic transmitter 101 to generate several times of ultrasonic signals to confirm the moving situation of the target object 9 or to calculate the moving speed of the target object 9. FIG. 6A to FIG. 6D illustrate schematic application diagrams of the driver assistance system according to different embodiments of the instant disclosure. Please refer to FIG. 6A to FIG. 6D. For example, when the processor 31 determines that the rear vehicle has entered the preset distance D2, the processor 31 controls the ultrasonic transmitter 101 to generate an ultrasonic signal again, so as to re-measure the distance D1 between the rear vehicle and the instant vehicle (e.g., the vehicle having the graphical ultrasonic module 30). Therefore, based on the ultrasonic signal and the moving speed of the instant vehicle itself, it is possible to determine whether the rear vehicle is approaching or moving away, or whether the rear vehicle is a just vehicle parked on the side of the road. For example, if the distance D2 minus the distance D1 divided by the interval between the two measurement times is the moving speed of the instant vehicle itself, then it can be determined that the rear vehicle is stationary. According to some embodiments, when the processor 31 determines that the target object 9 is stationary (step S04, the determination result is "Yes") and thus does not consider it as a driving threat, the processor 31 ignores the target object 9 and controls the ultrasonic transmitter 101 to generate the ultrasonic waves again to repeat the step S01 to step S03. When the processor 31 determines that the target object 9 is moving (step S04, the determination result is "No"), the processor 31 calculates the energy of the ultrasonic waves (step S05). For example, the processor 31 adds up the energy of the ultrasonic signals detected by each of the ultrasonic sensors 102 within a preset time interval, or the processor 31 obtains the maximum energy of the ultrasonic signals received within the preset time interval, or obtain the average energy of the ultrasonic signals above an energy threshold.

Figure 7A:
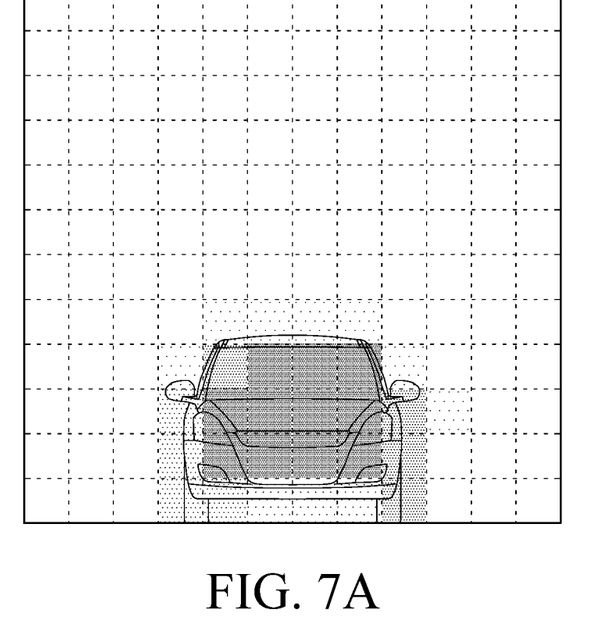
FIG. 7A and FIG. 7B illustrate schematic views of the energy distribution of the ultrasonic signals in different embodiments of the instant disclosure.
Figure 7B:
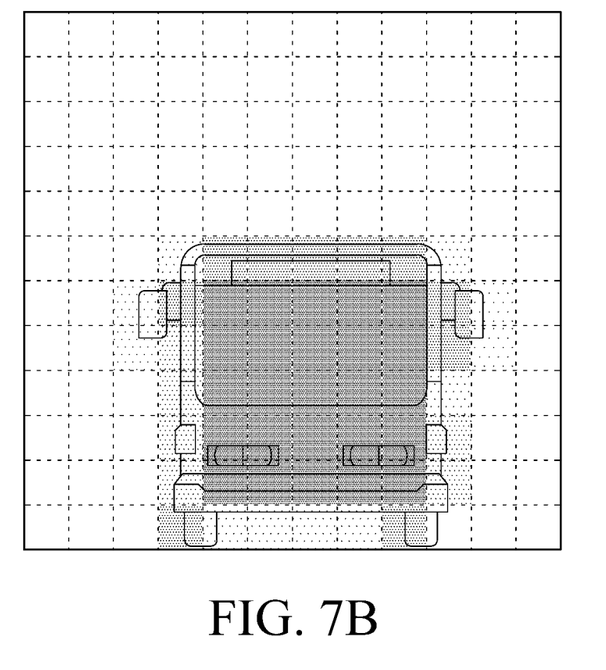

The energy of ultrasonic wave can be divided into multiple energy grades. The memory 32 is configured to store a look-up table, and the look-up table includes a correspondence relationship between a type of the target object 9 and an energy grade of the ultrasonic wave (also can be referred to "sound wave energy grade"). For example, the energy grade is divided into grades 1 to 5 according to energy intensity. Energy grade 1 corresponds to traffic cones or dogs, energy grade 2 corresponds to pedestrians, energy grade 3 corresponds to small passenger cars, energy grade 4 corresponds to small trucks or vans, and energy grade 5 corresponds to trucks or bus. The energy grade can be measured with the graphical ultrasonic module 30 to various target objects 9 at a fixed preset distance. Taking the embodiments shown in FIG. 7A and FIG. 7B as an example, the energy value of the ultrasonic wave reflected by a small passenger car in FIG. 7A is smaller than the energy value of the ultrasonic wave reflected by the bus in FIG. 7B. Therefore, it is understood that, for each type of the target object 9, multiple measurements are conducted to obtain the range of energy values, and thus the target objects 9 in FIG. 7A and FIG. 7B can be divided into two energy grades.

According to some embodiments, the look-up table includes a correspondence relationship among the type of the target object 9, the distance between the target object 9 and the graphical ultrasonic module 30, and the energy grade of the ultrasonic wave. For example, since the energy of the sound wave is attenuated over the transmission distance, the energy intensity measured by the small passenger car in FIG. 6A at the distance D1 may be the same as the energy intensity measured by the bus in FIG. 6D at the distance D2. However, it is understood that, in some embodiments, the attenuation of the energy of the sound wave (in dB) over distance can also be calculated according to the following Equation 4:

$$E_2 = E_1 + 10\log\left(\frac{r_1^2}{r_2^2}\right) \tag{Equation 4}$$

In Equation 4, $r_1$ represents the preset distance used in measuring the energy grade, $r_2$ represents the actually measured distance, $E_1$ represents the energy of the sound wave measured at the preset distance, and $E_2$ represents the actually measured energy of the sound wave. Therefore, when the processor 31 measures that the distance between the target 9 and the graphical ultrasonic module 30 is $r_2$ and the energy of the sound wave is $E_2$, the energy grade of the target object 9 can be calculated based on the preset distance used in measuring the energy grade, and then the type of the target object 9 can be determined according to the look-up table (step S06) based on the obtained energy grade of the target object 9. According to some embodiments, the look-up table includes the preset correspondence relationships among types of the target object 9, the beamforming directions, and the energy grade of the sound wave. For example, the lookup table includes the following data:

| Directions/types of the target object | Small passenger car (FIG. 7A) | Bus (FIG. 7B) |
|---|---|---|
| Upward (+30°) | 5 dB | 45 dB |
| Parallel to ground (0°) | 35 dB | 50 dB |
| Downward (−30°) | 30 dB | 40 dB |

The processor 31 can adjust the delay time t of the ultrasonic waves transmitted by the ultrasonic transmitters 101 of the ultrasonic transmitter array to transmit ultrasonic wave, or adjust the delay time t of the ultrasonic waves received by the ultrasonic sensors 102 of the ultrasonic sensor array so as to modify the beamforming direction, thereby further changing the energy distribution of the main lobe of the beamforming. Please refer to FIG. 7A and FIG. 7B. Generally, the height of a bus is greater than the height of a small passenger car. Therefore, when an ultrasonic wave is directed to the target object 9 with a higher elevation angle, the energy reflected by the bus is much higher than the energy reflected by the small passenger car. On the other hand, when an ultrasonic wave is directed to the target object 9 with a lower elevation angle, the energy difference between the two reflected ultrasonic waves is relatively small. Thus, it is optional that the processor 31 controls the ultrasonic transmitters 101 to transmit multiple ultrasonic waves directed to different directions (e.g. upwards, parallel to ground, and downwards) in the step S01 and controls the ultrasonic sensors 102 to receive the multiple ultrasonic waves in the step S02, or controls the ultrasonic transmitters 101 to transmit ultrasonic wave and controls the ultrasonic sensors 102 to receive the ultrasonic wave directed to different directions and temporally store the direction information in the step S02. In the step S05 and the step S06, the processor 31 calculates the energy of the sound wave at different directions and thus determines the type of the target object 9 according to the look-up table.

According to some embodiments, the driver assistance system 3 adjusts the driving parameters according to the distance between the target object 9 and the graphical ultrasonic module 30, the movement state of the target object 9, and the type of the target object 9 (step S07). The driving parameters may refer to parameters such as the driving speed, the gear position, the direction of the vehicle, the state of vehicle lights, and the state of horns. For example, when the driver assistance system 3 determines that the target object 9 within ten meters behind the vehicle is a dog which is running towards the vehicle with a speed of 40 kilometers per hour, the vehicle is allowed to not to react in response to the target object 9. On the other hand, when the driver assistance system 3 determines that the target object 9 within ten meters behind the vehicle is a truck which is moving towards the vehicle with a speed of 40 kilometers per hour, the vehicle should be accelerated or be deviated from the original lane. For another example, when the driver assistance system 3 determines that the target object 9 within ten meters behind the vehicle is a vehicle whose speed gradually decreases (the relative distance between the instant vehicle and the rear vehicle gradually increases), the instant vehicle is allowed to not to react in response to the target object 9 as well.

In summary, according to some embodiments, the graphical ultrasonic modules 10, 20 adopt beamforming methods to improve the energy concentration and the directivity of the ultrasonic signals, so that the graphical ultrasonic modules 10, 20 can be applied to long-distance obstacle detection. According to some embodiments, the graphical ultrasonic module 30 is applied to the driver assistance system 3 to assist in identifying obstacles in the driving environment. Further, in some embodiments, the driver assistance system 3 determines the threat degree of the obstacle based on the distance of the obstacle relative to the vehicle, the movement condition of the obstacle and the type of the obstacle so as to adjust the driving parameters accordingly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A graphical ultrasonic module, comprising:
    an ultrasonic sensor array comprising at least three ultrasonic sensors, wherein the ultrasonic sensors together form a virtual plane; and
    an ultrasonic transmitter array comprising a plurality of ultrasonic transmitters, wherein a geometric center of the ultrasonic sensor array is substantially the same as a geometric center of the ultrasonic transmitter array.

2. The graphical ultrasonic module according to claim 1, wherein the ultrasonic sensor array surrounds the ultrasonic transmitter array.

3. The graphical ultrasonic module according to claim 2, wherein the ultrasonic sensors are disposed on a circumference of a circle, and a center of the circle is substantially the same as the geometric center of the ultrasonic transmitter array.

4. The graphical ultrasonic module according to claim 3, wherein along the circumference of the circle, each two adjacent ultrasonic sensors of the ultrasonic sensors are substantially equally spaced from each other.

5. The graphical ultrasonic module according to claim 3, wherein the ultrasonic sensor array comprises a plurality of first ultrasonic sensors and a plurality of second ultrasonic sensors; a first distance is between each of the first ultrasonic sensors and the geometric center of the ultrasonic transmitter array, a second distance is between each of the second ultrasonic sensors and the geometric center of the ultrasonic transmitter array, and the second distance is greater than the first distance.

6. The graphical ultrasonic module according to claim 5, wherein an imaginary connection line between any one of the first ultrasonic sensors and the geometric center of the ultrasonic transmitter array is between two imaginary connection lines respectively between any two of the second ultrasonic sensors and the geometric center of the ultrasonic transmitter array.

7. A driver assistance system for detecting a target object, comprising:
    a graphical ultrasonic module according to claim 1;
    a memory storing a look-up table, wherein the look-up table comprises a correspondence relationship between types of the target object and energy grades of an ultrasonic wave; and
    a processor coupled to the ultrasonic sensors and the ultrasonic transmitters, wherein the processor is configured to:
    control the ultrasonic transmitters to generate an ultrasonic signal;
    determine a distance between the target object and the graphical ultrasonic module based on a trigger time that the ultrasonic signal is generated and based on a reception time that the ultrasonic signal is received by the ultrasonic sensors;
    add up an energy of the ultrasonic signal detected by each of the ultrasonic sensors to obtain an energy grade of the ultrasonic wave; and
    read the look-up table and determine a type of the target object based on the distance between the target object and the graphical ultrasonic module and the energy grade of the ultrasonic wave.

8. The driver assistance system according to claim 7, wherein the processor is further configured to:
  determine whether the target object is moving based on a plurality of the times that the ultrasonic signal is generated and a plurality the of times that the ultrasonic signal is received by the ultrasonic sensors; and
  when the processor determines that the target object is moving, add up the energy of the ultrasonic signal detected by each of the ultrasonic sensors to obtain the energy grade of the ultrasonic wave.

9. The driver assistance system according to claim 8, wherein the processor is further configured to:
  determine whether the distance between the target object and the graphical ultrasonic module is less than a preset distance; and
  when the processor determines that the distance between the target object and the graphical ultrasonic module is less than the preset distance, determine whether the target object is moving based on the plurality of the times that the ultrasonic signal is generated and the plurality of the times that the ultrasonic signal is received by the ultrasonic sensors.

* * * * *